United States Patent
Sung et al.

(10) Patent No.: US 11,205,283 B2
(45) Date of Patent: Dec. 21, 2021

(54) CAMERA AUTO-CALIBRATION WITH GYROSCOPE

(71) Applicant: QUALCOMM Incorporated, San Diego, CA (US)

(72) Inventors: Chiachi Sung, San Diego, CA (US); Gary Mcgrath, Carlsbad, CA (US); Christopher Brunner, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 292 days.

(21) Appl. No.: 15/641,510

(22) Filed: Jul. 5, 2017

(65) Prior Publication Data

US 2018/0232907 A1    Aug. 16, 2018

Related U.S. Application Data

(60) Provisional application No. 62/459,879, filed on Feb. 16, 2017.

(51) Int. Cl.
  *G06T 7/80* (2017.01)
  *H04N 17/00* (2006.01)
  *G06T 7/73* (2017.01)

(52) U.S. Cl.
  CPC ............... *G06T 7/80* (2017.01); *G06T 7/73* (2017.01); *H04N 17/002* (2013.01); *G06T 2207/10016* (2013.01); *G06T 2207/10024* (2013.01); *G06T 2207/20024* (2013.01)

(58) Field of Classification Search
  CPC ............ G06T 7/80; G06T 7/73; H04N 17/002
  See application file for complete search history.

(56) References Cited

U.S. PATENT DOCUMENTS

| | | | | |
|---|---|---|---|---|
| 6,556,722 | B1 * | 4/2003 | Russell | G01S 5/16 348/94 |
| 7,821,535 | B2 * | 10/2010 | Morita | H04N 17/002 348/187 |
| 9,916,689 | B2 * | 3/2018 | Rhee | G06F 3/04815 |

(Continued)

FOREIGN PATENT DOCUMENTS

EP    0948760 B1    7/2002

OTHER PUBLICATIONS

M. Li, H. Yu, X. Zheng and A. I. Mourikis, "High-fidelity sensor modeling and self-calibration in vision-aided inertial navigation,"& nbsp;2014 IEEE International Conference on Robotics and Automation (ICRA), Hong Kong, 2014, pp. 409-416. (Year: 2014).*

(Continued)

*Primary Examiner* — Hesham K Abouzahra
(74) *Attorney, Agent, or Firm* — Qualcomm Incorporated

(57) ABSTRACT

Embodiments include devices and methods for automatically calibrating a camera. In various embodiments, an image sensor may capture an image. Locations of one or more points including in the captured image frames may be predicted and detected. Calibration parameters may be calculated based on differences between predicted locations of a selected point within an image frame and observed locations of the selected point within the captured image frame. The automatic camera calibration method may be repeated until the calibration parameters satisfy a calibration quality threshold.

28 Claims, 8 Drawing Sheets

(56) References Cited

U.S. PATENT DOCUMENTS

| | | | |
|---|---|---|---|
| 2011/0216201 A1* | 9/2011 | McAndrew | G06T 7/80 |
| | | | 348/148 |
| 2014/0104445 A1* | 4/2014 | Ramachandran | G01C 25/00 |
| | | | 348/208.2 |
| 2015/0092048 A1* | 4/2015 | Brunner | H04W 4/33 |
| | | | 348/135 |
| 2015/0201180 A1 | 7/2015 | Mourikis et al. | |
| 2015/0254872 A1 | 9/2015 | De Almeida Barreto et al. | |
| 2017/0070731 A1 | 3/2017 | Darling et al. | |
| 2017/0078576 A1* | 3/2017 | Ryu | H04N 5/23254 |
| 2019/0370983 A1* | 12/2019 | Zhou | G05D 1/101 |

OTHER PUBLICATIONS

Mingyang L., et al., Optimization based Estimator Design for Vision-Aided Inertial Navigation, Robotics Science and System, 2012, Sydney Australia, Jul. 9-13, 2012, 8 pages.

Mourikis A.I., et al., "A Multi-State Constraint Kalman Filter for Vision-aided Inertial Navigation", 2007 IEEE International Conference On Robotics and Automation—Apr. 10-14, 2007—Roma, Italy, IEEE, Piscataway, NJ, USA, XP031389349, ISBN: 978-1-4244-0601-2, Apr. 10, 2007 (Apr. 10, 2007), pp. 3565-3572.

Foxlin E.M., et al., "Generalized Architecture for Simultaneous Localization, Auto-Calibration, and Map-Building", Proceedings of the 2002 IEEE/RSJ International Conference on Intelligent Robots and Systems, (IROS 2002), vol. 1, Sep. 30, 2002 (Sep. 30, 2002), New York, US, pp. 527-533, XP010609305, DOI: 10.1109/IRDS.2002.1041444, ISBN: 978-0-7803-7398-3.

International Search Report and Written Opinion—PCT/US2017/068346—ISA/EPO—Mar. 15, 2018.

Li M., et al., "High-Fidelity Sensor Modeling and Self-calibration in Vision-Aided Inertial Navigation", 2014 IEEE International Conference on Robotics and Automation (ICRA), IEEE, May 31, 2014 (May 31, 2014), pp. 409-416, XP032650220, DOI: 10.1109/ICRA.2014.6906889 [retrieved on Sep. 22, 2014].

Weiss S., et al., "Inertial Optical Flow for Throw-and-Go Micro Air Vehicles", 2015 IEEE Winter Conference on Applications of Computer Vision, IEEE, Jan. 5, 2015 (Jan. 5, 2015), pp. 262-269, XP032738173, DOI: 10.1109/WACV.2015.42 [retrieved on Feb. 19, 2015].

\* cited by examiner

CAMERA AUTO-CALIBRATION WITH GYROSCOPE

RELATED APPLICATIONS

This application claims the benefit of priority to U.S. Provisional Application No. 62/459,879 entitled "Camera Auto-Calibration with Gyroscope" filed Feb. 16, 2017, the entire contents of which are hereby incorporated by reference.

BACKGROUND

In order to process digital images, cameras included within an electronic device need to be calibrated. Typically, cameras have been calibrated at the manufacturer of the electronic device. However, this calibration increases the manufacturing process and does not support later calibration of cameras.

SUMMARY

Various embodiments include methods, and electronic devices with a processor implementing the methods for calibrating a camera. Various embodiments may include receiving a first image frame, selecting at least one point in the first image frame, receiving a second image frame, determining a location of the at least one point in the second image frame, receiving in the processor from a gyroscope a measurement of rotational velocity of the camera corresponding to a time between the first and second image frames, calculating a predicted location in the second image frame of the at least one selected point based on the measurement of rotational velocity of the camera and the location of the at least one point in the first image frame, calculating calibration parameters for the camera based on a difference between the predicted location of the at least one selected point in the received second image frame, and using the calculated calibration parameters to process data from the camera.

Some embodiments may further include storing, in a memory, the determined location of the at least one point in the second image frame, and storing, in the memory, the predicted location in the second image frame of the at least one selected point, where calculating calibration parameters for the camera based on a difference between the predicted location of the at least one selected point in the second image frame and a determined location of the at least one selected point in the received second image frame comprises calculating the calibration parameters based on the stored determined location of the at least one point in the second image frame and predicted location of the at least one point in the second image frame.

Some embodiments may further include calculating a quality or confidence value of the calculated calibration parameters for the camera, determining whether the quality or confidence value of the calculated calibration parameters exceeds a threshold value, repeating at least some operations of the methods summarized above using the calculated calibration parameters to process data from the camera to generate the next image frame in response to determining that the quality or confidence value of the calculated calibration parameters exceeds the threshold value, and using either the calculated calibration parameters or previously calculated calibration parameters to process data from the camera in response to determining that the quality or confidence value of the calculated calibration parameters does not exceed the threshold value.

In some embodiments, calculating calibration parameters for the camera based on a difference between the predicted location of the at least one selected point in the second image frame and a determined location of the at least one selected point in the received second image frame may include applying the predicted location of the at least one selected point in the second image frame and the determined location of the at least one selected point in the received second image frame to a Kalman filter. In such embodiments, the Kalman filter may be an extended Kalman filter.

In some embodiments, using the calculated calibration parameters to process data from the camera may include using the calculated calibration parameters to process data from the camera to undistort distortions caused by a lens. In some embodiments, using the calculated calibration parameters to process data from the camera may include using the calculated calibration parameters as inputs to a computer vision or machine vision algorithm.

In some embodiments, the processor and the gyroscope may be included within the camera. In some embodiments, the camera may be an electronic device, and the processor and gyroscope may be in the electronic device. In some embodiments, the camera may be on a drone that comprises an avionics unit, and calculating calibration parameters for the camera based on a difference between the predicted location of the at least one selected point in the second image frame and a determined location of the at least one selected point in the received second image frame may include calculating the calibration parameters based on translational velocity information, acceleration information, or both translational velocity and acceleration information received from the avionics unit.

Various embodiments may further include an electronic device having a camera, a gyroscope, a memory, and a processor configured with processor-executable instructions to perform operations of the methods summarized above. Various embodiments include a processing device for use in electronic devices and configured to perform operations of the methods summarized above. Various embodiments include an electronic device having means for performing functions of the methods summarized above.

BRIEF DESCRIPTION OF THE DRAWINGS

The accompanying drawings, which are incorporated herein and constitute part of this specification, illustrate example embodiments, and together with the general description given above and the detailed description given below, serve to explain the features of various embodiments.

DETAILED DESCRIPTION

Figure 1:
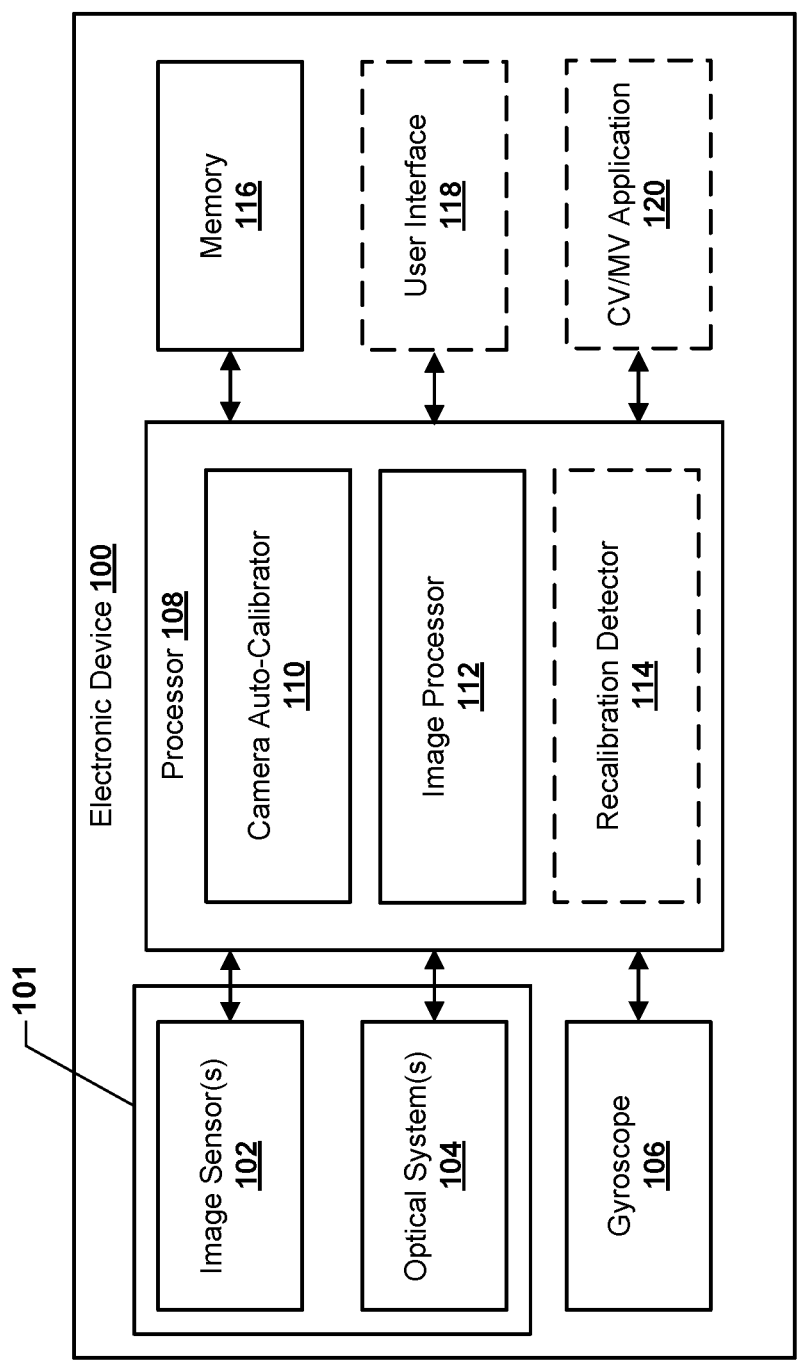
FIG. 1 is a component block diagram illustrating components of an electronic device according to various embodiments.

Various embodiments will be described in detail with reference to the accompanying drawings. Wherever possible, the same reference numbers will be used throughout the drawings to refer to the same or like parts. References made to particular examples and embodiments are for illustrative purposes, and are not intended to limit the scope of the claims.

Various embodiments include methods that may be implemented on a processor of an electronic device for calibrating a camera without the need for a known target. Various embodiments may include a gyroscope configured to measure how the camera moves where camera calibration parameters may be determined by comparing a motion of an object over consecutive image frames captured by the camera and corresponding gyroscope readings. The calibration parameters determined by the calibration method may be used to processes raw image data from the camera to produce digital images. The calibration parameters may be used directly on the image frames produced by the camera, such as to undistort any distortion caused by the lens. The calibration parameters may also be used as input parameters to algorithms using camera image data. For example, vision based positioning algorithms require good calibration parameters in order to produce accurate results.

Various embodiments do not require a known target and calibration may be performed by the electronic device automatically (e.g., without user intervention) and/or in the background (e.g., without user knowledge). Various embodiments may reduce manufacturing cost and complexity by performing calibration outside of the factory, and enable the camera to be calibrated over time. In addition, various embodiments utilize additional calibration parameters not available in convention calibration methods. For example, calibration parameters may include a relative orientation between the camera and the gyroscope, time relationship or alignment parameters corresponding to image capture and gyroscope measurements.

Cameras have been implemented in various electronic devices, such as smartphones, drones, cars, home security systems, and even vacuum cleaners. The images captured by the cameras are no longer simply for photographs or recording videos. Instead, information may be extracted from the images captured by a camera to make additional decisions or perform additional actions without user interaction. For example, computer vision (CV) or machine vision (MV) algorithms can extract information from captured images for various applications including positioning, mapping, object detection, three-dimensional reconstruction, etc. Since CV or MV rely on modeling how real world objects appear in captured images, a high level of accuracy is needed when processing the images captured by the camera.

In order to achieve a high level of accuracy, a digital camera is typically calibrated in a procedure that identifies calibration parameters corresponding to the camera that is needed in order to provides an accurate and consistent mapping from the digital image to the real-world objects. For example, the calibration parameters are used in processing raw image data so that straight lines in the real world also appear straight in the generated image, and round objects in the real world do not become ellipses in the generated image. For example, vision based positioning algorithms may require good calibration parameters in order to properly place objects (or the camera) within the real world. Calibration parameters may include intrinsic parameters (e.g., parameters that depend upon the elements of the camera such as principal point, focal length, lens distortion, etc.) and/or extrinsic parameters (e.g., parameters that correspond to position and/or orientation of the camera with respect to other sensors or a time relationship between image capture and sensor readings).

Due to manufacturing variances, each camera is unique and needs to be calibrated individually. Typically, calibration is performed at the manufacturer where the camera is positioned at a known distance from a target object having a known size, shape, and texture. A common target is a checkerboard. When a checkerboard is employed during calibration, the known shapes and dimensions of the target may be compared with the resulting image of the target to calculate calibration parameters for the camera.

However, performing calibration during manufacturing requires an additional step that can be time consuming. In addition, special equipment and software used in calibration at the manufacturer may be unavailable to an end user, so camera calibrations are typically only performed once. The calibration performed at manufacture may not be valid forever as some dimensional characteristics of the camera may change with time due to physical or environmental changes. For example, significant acceleration or deceleration events (e.g., collisions or drops) or large changes in temperature or humidity factors may affect the dimensions and angles between a lens and the image sensor of the camera. This may be especially problematic for cameras mounted on machines or robots. For example, outdoor devices, such as flying drones or cars, may face harsh environment conditions compared to smartphones.

Other calibration methods require user intervention. In addition, inaccuracy introduced through user error may degrade the calibration quality. Such calibration methods may only calculate calibration parameters based on best effort values only. Thus, the quality of the calibration parameter calculations may not be determined or considered, and thus undesired errors in the calibration parameters may remain.

In some conventional camera calibration methods, a predetermined amount of data may be captured and processed offline to perform the calibration. If insufficient data is captured, the calibration method may need to be restarted. This type of calibration does not provide for continuous calibration of the camera. Some camera calibration methods require pure rotation of the camera without any translation, which is difficult to achieve outside of a laboratory (e.g., in a real-world setting).

Various embodiments overcome shortcomings of conventional camera calibration methods by providing methods for calibrating a camera automatically without the need for a known calibration target or user involvement.

Various embodiments may be implemented within a variety of electronic devices, an example 100 of which is illustrated in FIG. 1. An electronic device 100 suitable for use with various embodiments may include one or more cameras 101 each including an image sensor 102 and an optical system 104, a gyroscope 106, a processor 108, and a memory 116. Examples of the electronic device 100 include a camera, a video camcorder, a digital camera, a cellular phone including a camera, a smartphone including a camera, a computer including a camera (e.g., a desktop computer, a laptop computer, etc.), a tablet device including a camera, a media player, a television, a gaming console, a wearable device, a virtual reality device, an augmented reality device, a mixed reality device, a surveillance camera, a smart appliance, a smart application, healthcare equipment, a set-top box, a ground-based machine (e.g., robots, vehicles, automobiles, etc.), an aircraft, a drone or unmanned aerial vehicle (UAV), etc. or a combination thereof.

The electronic device 100 may include one or more cameras 101, each of which may include at least one image sensor 102 and at least one optical system 104 (e.g., one or more lenses). A camera 101 of the electronic device 100 may obtain one or more digital images (sometimes referred to herein as image frames). The camera 101 may employ different types of image capture methods such as a rolling-shutter technique or a global-shutter technique.

Typically, the optical system 104 (e.g., lenses) is configured to focus light from a scene and/or objects located within the field of view of the camera 101 onto the image sensor 102. The image sensor 102 includes a large number of light systems configured to generate signals in response to light that are processed to obtain a digital image that is stored in memory 116 (e.g., an image buffer). The optical system 104 may be coupled to and/or controlled by the processor 108, such as to provide auto focusing actions.

The optical system 104 may include one or more lenses. For example, the optical system 104 may include a wide-angle lens, a wide-FOV lens, a fisheye lens, etc. or a combination thereof. In addition, the optical system 104 may capture panoramic images, including 200-360 degree images.

While not illustrated in FIG. 1, the electronic device 100 may include an image data buffer that is a memory separate from the memory 116. An image data buffer may be part of the camera 101 and configured to buffer (i.e., temporarily store) image data from the image sensor 102. The buffered image data may be provided to or accessible by the processor 108.

The electronic device 100 may include a camera software application and/or a display, such as a user interface 118. When the camera application is executed, images of objects located within the field of view of the optical system 104 may be captured by the image sensor 102. Captured images may be presented on a display of the user interface 118. In some configurations, captured images may be displayed in rapid succession at a relatively high frame rate so that, at any given moment, the scene and/or object(s) within the field of view of the camera 101 are presented on the display. In various embodiments, additional or alternative information corresponding to the captured images may be displayed. For example, one or more regions of interest (e.g., bounding boxes) and/or depth information (e.g., one or more estimated distances to one or more selected objects) may be presented using the user interface 118.

The gyroscope 106 may be configured to measure rotational movements of the electronic device 100. For example, the gyroscope 106 may capture a plurality of angular velocity measurements, including an x-axis component, a y-axis component, and a z-axis component. In various embodiments, the gyroscope measurements may be stored in memory (e.g., a buffer or the memory 116) accessible by processor 108.

In various embodiments, the sequence of images captured by the camera 101 and angular motion measurements obtained by the gyroscope 106 may be timestamped to enable the processor 108 of the electronic device 100 to determine the degree to which the camera 101 rotated about the three axes from one image frame to the next.

In various embodiments, the processor 108 may be coupled to (e.g., in electronic communication with) the one or more image sensor 102, the one or more optical system 104, the gyroscope 106, and the memory 116. In addition, when the electronic device 100 may include a user interface 118 (e.g., input/output devices, display, touchscreen, etc.) coupled to the processor 108 and a computer vision (CV) or machine vision (MV) application 120 executing on the processor 108. The processor 108 may be a general-purpose single-chip or multi-chip microprocessor (e.g., an ARM), a special-purpose microprocessor (e.g., a digital signal processor (DSP)), a microcontroller, a programmable gate array, etc. The processor 108 may be referred to as a central processing unit (CPU). Although a single processor 108 is illustrated in FIG. 1, an electronic device 100 may include multiple processors (e.g., a multi-core processor) or a combination of different types of processors (e.g., an ARM and a DSP).

The processor 108 may be configured to implement the methods of various embodiments to calibrate the camera 101 of the electronic device 100. For example, the processor 108 may include and/or implement a camera auto-calibrator 110, an image processor 112, and/or a recalibration detector 114. The camera auto-calibrator 110, the image processor 112, and/or the recalibration detector 114 may be implemented in hardware or firmware, as a module executing on the processor 108, and/or in a combination of hardware, software, and/or firmware.

The memory 116 may store data (e.g., image data and camera calibration factors) and instructions that may be executed by the processor 108. Examples of instructions and/or data that may be stored in the memory 116 in various embodiments may include image data, gyroscope measurement data, camera auto-calibration instructions including object detection instructions, object tracking instructions, object location predictor instructions, timestamp detector instructions, calibration parameter calculation instructions, calibration parameter(s)/confidence score estimator instructions, a calibration parameter/confidence score variance threshold data, a detected object location of a current frame data, a predated object location in the next frame data, calculated calibration parameter data, etc. The memory 116 may be any electronic component capable of storing electronic information, including for example random access memory (RAM), read-only memory (ROM), magnetic disk storage media, optical storage media, flash memory devices in RANI, on-board memory included with the processor, erasable programmable read only memory (EPROM), electrically erasable programmable read only memory (EEPROM), registers, and so forth, including combinations thereof.

In some embodiments, the processor 108 may be configured with a CV/MV application 120 that may be configured to program or control movements of the electronic device 100 (e.g., an automobile, robot, drone, etc.) including controls to cause the electronic device 101 to rotate during camera autocalibration procedures.

One or more of the elements or components of electronic device 100 may be combined and/or divided. For example, the camera auto-calibrator 110, the image processor 112, and the recalibration detector 114 may be combined into a single module and/or hardware component. Additionally or alternatively, one or more of the camera auto-calibrator 110, the image processor 112, and the recalibration detector 114 may be divided into elements or components that perform a subset of the operations thereof.

Figure 2:
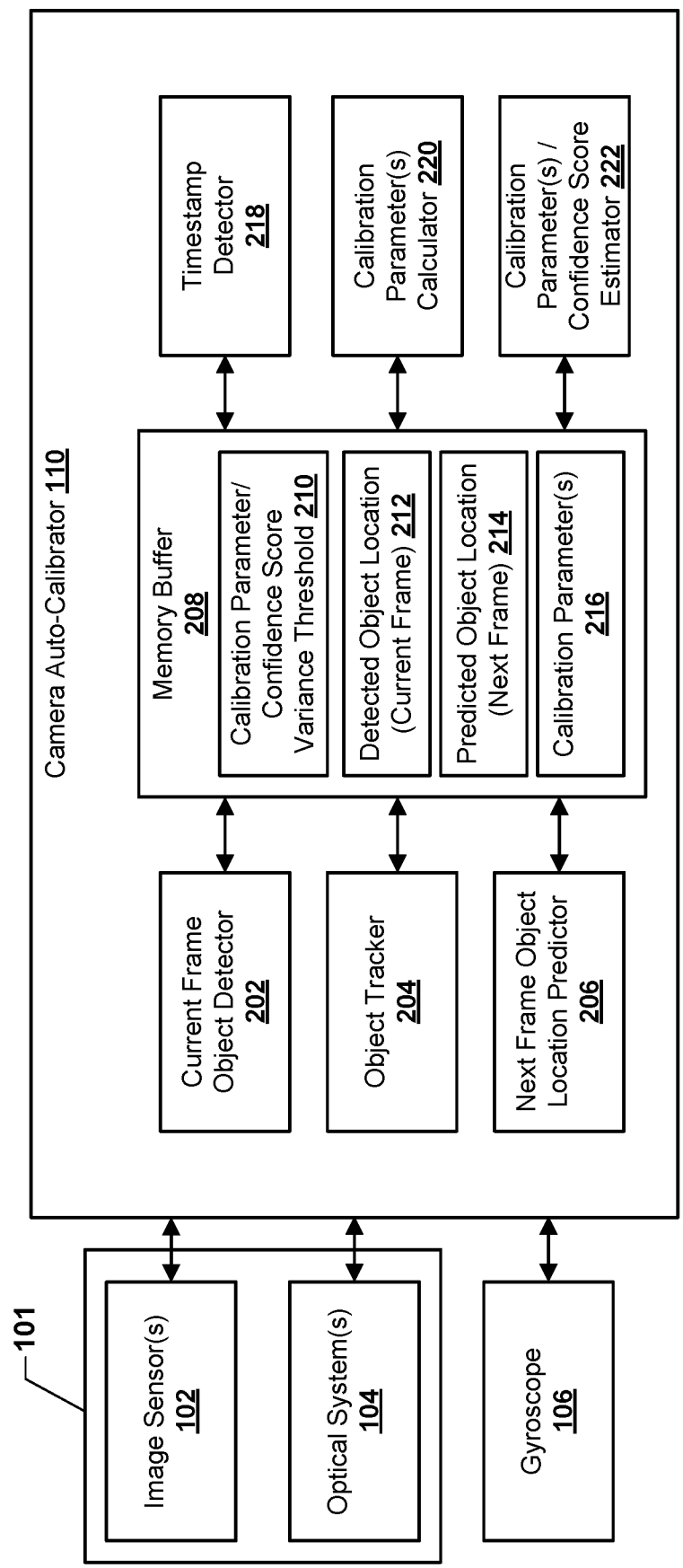
FIG. 2 is a component block diagram illustrating components of a camera suitable for use with various embodiments.

FIG. 2 illustrates a camera auto-calibrator 110 of the electronic device 100 according to various embodiments. With reference to FIGS. 1 and 2, the camera auto-calibrator 110 may be implemented in hardware components and/or software components of the electronic device 100, the operation of which may be controlled by one or more processors (e.g., the processor 108) of the electronic device 100. To enable camera auto-calibration, calibration parameters may be dynamically calculated by comparing motion of an object between image frames to predicted movement of the object based on gyroscope measurements. In addition, a quality or confidence score associated with the calculated calibration parameters may be estimated based on the predicted and measured locations of selected points of the object.

The image sensor 102 of the camera 101 may capture a series of image frames including an object when the object is in the field of view of the optical system 104. Image frames may be captured rapidly, such as 30 to 60 frames per second. The image sensor 102 may provide image data associated with image frames to the processor 108 and/or the current frame object detector 202 of the camera auto-calibrator 110. For ease of reference, sequential image frames may be referred to as a first image frame and a second image frame, or as a preceding image frame and a next image frame. However, such references are arbitrary as in a subsequent processing operation the second or next image frame becomes the preceding or first image frame.

The current frame object detector 202 may identify one or more points associated with an object appearing within any two image frames (e.g., a first image frame and a second image frame). For example, one or a combination of high contrast pixels may be identified for tracking within the sequence of image frames. Any known shape recognition method or technique may be used to identify portions of objects or details within an image frame for tracking. For example, the Kanade-Lucas-Tomasi (KLT) feature tracker may be used to identify and track objects or details within image frames. In addition, the current frame object detector 202 may measure or detect a location (e.g., a coordinate value) of the identified one or more points associated with the object within the image frames. The detected location of the identified one or more points associated with the object within each image frame may be stored in the detected object location of the current frame portion 212 of the memory buffer 208.

The calibration parameter(s) calculator 220 may calculate calibration parameters based on the image data from two image frames, the detected location of the identified one or more points associated with the object within the two image frames, and gyroscope measurements of the rotational motions of the camera 101 between the two image frames. For example, the calibration parameter(s) calculator 220 may calculate extrinsic calibration parameters and intrinsic calibration parameters. After the calibration parameters with respect to the first image frame are calculated, the calculated calibration parameters may be stored in the calibration parameter(s) portion 216 of the memory buffer 208.

In various embodiments, a principal point calibration parameter may correspond to a position of an optical center in the image and may be calculated based on the image data associated with two image frames and/or the detected location of the identified one or more points associated with the object within the two image frames. The calibration parameter(s) calculator 220 may further calculate focal length calibration parameters corresponding to the image frames and/or a lens distortion calibration parameters based on the image data associated with the image frames and/or the detected location of the identified one or more points associated with the object within the image frames.

In calculating calibration parameters, the calibration parameter(s) calculator 220 may take into account a time relationship between when the image frames are captured and when the rotational velocity measurements of the gyroscope are captured. For example, each image frame may include a timestamp indicating when the image frame was captured. The timestamp of each image frame may be provided by a processor associated with the image sensor 102 or the processor 108. In addition, the rotational velocity measurements of the gyroscope 106 may include timestamps indicating when the gyroscope measurements made. For example, the gyroscope 106 may include timestamp data along with measurement data, or the processor 108 may assign a time stamp to signals from the gyroscope 106 as the signals are received. A timestamp detector 218 (or a module executing within the processor 108) may compare the timestamps associated with image frames with timestamps associated with gyroscope 106 measurements when calculating the amount of rotation of the camera 101 that occurred between two image frames.

In various embodiments, the timestamp associated with the image frames or the gyroscope measurements may be a single value or a time period or range of values. For example, the time it takes to capture an image (e.g., $1/30^{th}$ or $1/60^{th}$ of a second) may be greater than the time it takes to obtain a single gyroscope rotational velocity measurement (e.g., 2 milliseconds), therefore a plurality of gyroscope measurements may correspond to the timestamps of two sequential image frames. Additionally or alternatively, the timestamp detector 218 may monitor the timestamps associated with image frames and the timestamps associated with gyroscope measurements to determine an initial synchronization or correlation between the timestamps associated with image frames and the timestamps associated with gyroscope measurements.

Additionally, the way that image data is obtained by a camera 101 may affect when objects are captured in image frames. When the camera 101 of the electronic device 100 is operating in a rolling shutter mode, each horizontal line (or vertical column) is exposed over one interval. The timestamp associated with the image frame generated when the camera is operating in the rolling shutter mode is based on a center exposure time for each line where the timestamp includes two values, an indication of the beginning of the image frame and an indication of the end of the frame based on the center exposure time of the first horizontal line (or vertical column) and the last horizontal line (or vertical column).

Using the identified one or more points associated with the object within a first image frame and the gyroscope measurements of rotational velocity between the first image frame and the next (second) image frame, a next frame object location predictor 206 (e.g., a module or operation executing in the processor 108) may predict where the one or more points associated with the object will appear within the second image frame. This calculation may be a simple linear estimate of the change in position of each of the points based upon the measured rotational velocity. Translational motion of the camera may be estimated in an extended Kalman filter (EKF), next to all the calibration parameters.

The translation motion estimate may be omitted in the final output, because its quality may not be as good as the calibration parameters.

The predicted locations of the tracked objects may then be compared to the locations in a subsequent or second image frame to determine the difference between predicted and observed locations. The location (i.e., pixels) in an image frame of each detect one or more points of an object will depend upon the calibration parameters used to process the image data. Thus, the differences between predicted and observed locations of points of tracked object(s) reflect errors in the calibration parameters. A calibration parameter (s)/confidence score estimator 222 (e.g., a module or operation executing in the processor 108) may calculate a new set of calibration parameters that would zero out the differences between predicted and measured locations of the identified points associated with the object(s) between the first and second image frames. Additionally, the calibration parameter(s)/confidence score estimator 222 may estimate a quality or confidence score of the previous calibration parameters based on the differences between predicted and observed locations of points of tracked object(s). For example, the estimated confidence score may be used to infer an error between the predicted object location in the first frame and the location of the identified one or more points associated with the object detected in the first frame. As another example, a weighted average between the calculated calibration parameters and the initial calibration parameters may be determined where the weighted values are based on the estimated confidence score. The calculated quality or confidence score of the previous calibration parameters may be used to determine whether the calibration parameters camera 101 have reached an acceptable level of quality.

The calibration parameter(s)/confidence score estimator 222 may compare the quality or confidence score to a calibration parameter/confidence score variance threshold (which may be stored at portion 210 of the memory buffer 208). So long as the quality or confidence score of the estimated calibration parameter(s) and/or confidence score is not within the variance threshold, the calibration parameters stored at 216 may be updated with the calculated new set of calibration parameters, and the process repeated, using the new set of calibration parameters to process the next image frame, comparing the predicted locations points of a tracked object to the observed locations in the next image frame, and calculating another set of calibration parameters and quality or confidence score. When the quality of the estimated calibration parameter(s) and/or confidence score is within the variance threshold, the camera calibration procedure may be ended and thereafter the image processor 112 may perform imaging processing of raw image frame data using the calibration parameters stored in memory (e.g., at portion 216 of the memory buffer 208).

Thus, in various embodiments, the camera calibration methods may be performed in a loop until sufficient image quality is obtained. Once sufficient image quality is obtained using the calibration parameters determined by the calibration methods, those calibration parameters are used for processing raw image data from the camera's image sensor 102 to generate digital images. In some embodiments, the calibration methods may be performed periodically (e.g., daily, monthly, yearly, etc.) or after a triggering event (e.g., power-up, detection by an accelerometer of a high acceleration event, a change in altitude, temperature, and/or humidity, etc.). In some embodiments, the camera calibration methods may be omitted or skipped if a triggering event is not detected. For example, if the triggering event is the movement or motion of the camera, the camera calibration method may only be initiated and performed in response to detecting movement or motion of the camera.

Some embodiments may rely solely on measurements from the gyroscope 106 to predict locations of identified points of an object in the image frames. However, in some embodiments measurements from other sensors may be used in the calibration methods. For example, measurements of camera accelerations from an accelerometer may be combined with the rotational velocity measurements provided by the gyroscope to better predict the locations of objects in each image frame. As another example, in some embodiments in which the camera (e.g., 101) is positioned on a vehicle capable of fast motion (e.g., a drone or car), information regarding the velocity of the vehicle (e.g., provided by an avionics module of a drone) may be combined with the rotational velocity measurements provided by the gyroscope (as well as acceleration data from an accelerometer) to better predict the locations of objects in each image frame.

Figure 3:
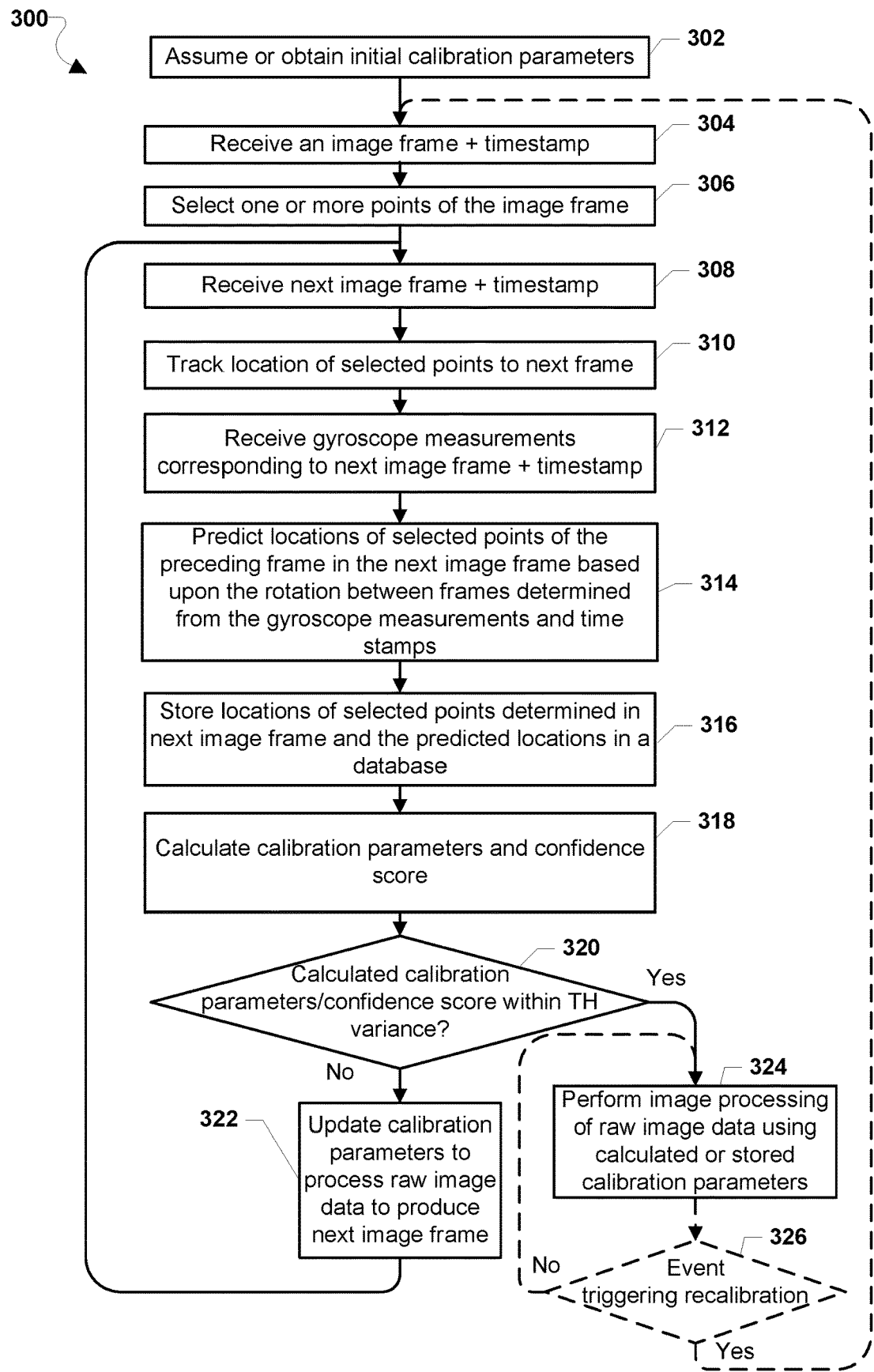
FIG. 3 is a process flow diagram illustrating a method for calibrating a camera of an electronic device according to various embodiments.

FIG. 3 illustrates a method 300 of calibrating a camera for an electronic device (e.g., electronic device 100 in FIG. 1) according to various embodiments. With reference to FIGS. 1-3, the method 300 may be implemented by one or more processors (e.g., processor 108 and/or the like) of an electronic device 100 or camera 101.

In block 302, initial calibration parameters may be assumed or obtained from memory. For example, the initial calibration parameters may be obtained from memory where the data has been stored following a previously performed camera auto-calibration method or the initial calibration parameters may be provided by a device manufacturer or other entity. As another example, default calibration parameters may be provided by a camera manufacturer. In a further example, calibration parameters may be set to an arbitrary value, such as zero.

In block 304, the processor may receive an image frame and an associated timestamp. For example, an image frame may be captured by the image sensor 102 of a camera 101 when an object comes into the field of view of the optical system 104 and provided by the image sensor 102 to the processor.

In block 306, one or more points of the image frame may be selected by the processor. For example, a current frame object detector 202 executing in the processor and/or in firmware may identify one or more points within the image frame that have characteristics suitable for tracking.

In block 308, a next image frame and associated timestamp may be captured by the image sensor and provided to the processor. In some embodiments, the next image frame may be the very next image frame generated by the image sensor. In some embodiments, the next image frame provided to the processor may skip one or more image frames captured by the image sensors, thereby providing more time for movement of the tracked object(s) between processed image frames.

In block 310, the location of the tracked points of the object may be located in the next frame. For example, the object tracker 204 may locate within next image frame the one or more points identified in the first image frame once the raw image data is processed using the current calibration parameters.

In block 312, rotational velocity measurements corresponding to the next image frame and an associated timestamp may be received by the processor from a gyroscope (e.g., 106). In some embodiments, continuous measurements of rotational velocity may be received by the processor from the gyroscope during the time between the initial (first) image frame capture and the next (second) image frame capture. As part of the operations in block 312, the processor may calculate an average rotational velocity about three axes during the time between the initial (first) image frame capture and the next (second) image frame capture.

In block 314, locations of the selected points from in the next image frame may be predicted by the processor based upon the measured rotational velocity of the camera. For example, the processor may calculate the amount of rotation of the camera that occurred between the first and second image frames and calculate the direction and how far each point should have moved across the image plane as a result.

In block 316, the locations of the selected points observed in the next image frame and the predicted locations of the selected points may be stored in memory (e.g., in a database). For example, the observed object location associated with a current frame may be stored at the detected object location position 212 of the memory buffer 208, and the predicted object location in the next frame may be stored at the predicted object location position 214 of the memory buffer 208.

In block 318, the processor may use the stored observed and predicted locations of object points in the next image frame to calculate new calibration parameters and a confidence score for the new calibration parameters. For example, a calibration parameter(s)/calibration score estimator (e.g., 222) may estimate new calibration parameters that would zero out the difference between observed and predicted locations of tracked objects in the next image frame, and estimate a confidence score from the calibration parameters based on magnitude of the difference between the observed and predicted locations of the tracked objects in the next frame.

In determination block 320, the processor may determine whether the estimated calibration parameters/confidence score is within a threshold variance. For example, the processor may compare the estimated calibration parameters/confidence score with a calibration parameter/confidence score variance threshold stored at position 210 of the memory buffer 208.

In response to determining that the estimated calibration parameters/confidence score is not within the threshold variance (i.e., determination block 320="No"), the processor 108 may update the calibration parameters used for processing raw image data in block 322, and repeat the calibration process by obtaining the next image frame in block 308 using the updated calibration parameter to process the raw image data from the image sensor (e.g., 102). Thus, the new calibration parameters calculated based on the differences between the predicted and observed locations of objects in the now preceding image frame may be used to process the raw image data of the next image frame, and the process of comparing predicted to observed locations repeated.

In response to determining that estimated calibration parameters/confidence score is within the threshold variance (i.e., determination block 320="Yes"), the processor may end the calibration process in block 324 and perform subsequent image processing of raw image data from the image sensor (e.g., 102) using the calculated calibration parameters stored in memory. For example, the calculated calibration parameters may be used to process data from the camera to undistort distortions caused by a lens. As another example, the calculated calibration parameters may be used as inputs to a computer vision or machine vision algorithm. The stored calibration parameters may be either the calibration parameters calculated in block 318 or calibration parameters calculated in the previous iteration of the method 300.

Optionally, in determination block 326, the processor may determine whether an event triggering recalibration has occurred. For example, the recalibration detector 114 may determine whether a time triggering event or a physical triggering event has occurred. In response to determining that a triggering event has not happened (i.e., determination block 326="No"), the processor may continue to perform image processing using the calculated calibration parameters in block 324. In response to determining that a triggering event has happened (i.e., determination block 326="Yes"), the processor may repeat the calibration procedure by obtaining an image frame and timestamp returns in block 304.

Figure 4:
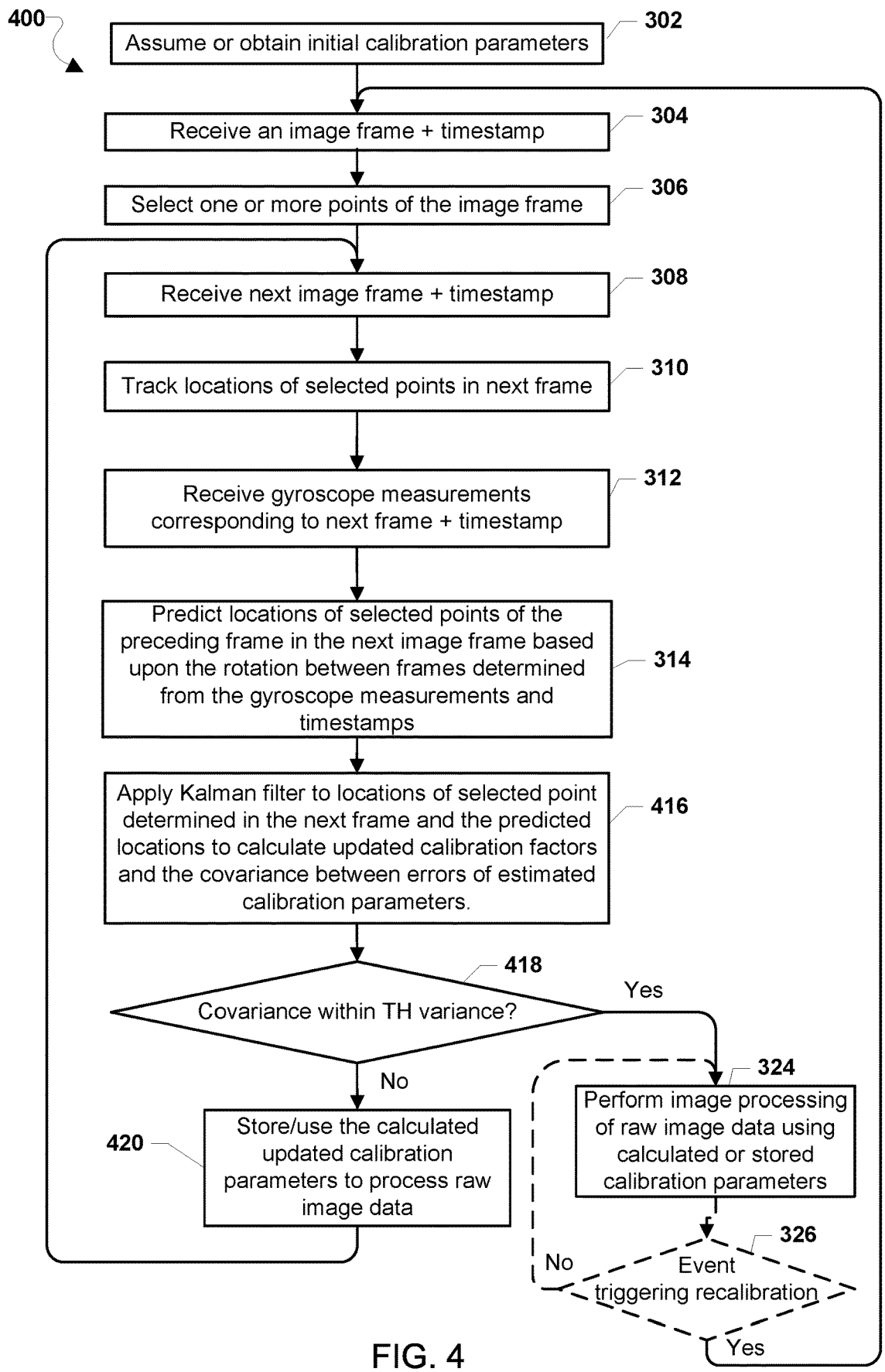
FIG. 4 is a process flow diagram illustrating a method for calibrating a camera of an electronic device according to various embodiments.

FIG. 4 illustrates another method 400 of calibrating a camera for an electronic device (e.g., electronic device 100 in FIG. 1) according to various embodiments. With reference to FIGS. 1-4, the method 400 may be implemented by one or more processors (e.g., processor 108 and/or the like) of a camera (e.g., 101) or an electronic device (e.g., 100). In the method 400, operations of blocks 302-314 may be performed as described for like numbered blocks of the method 300.

In block 416, the processor may apply a Kalman filter to locations of the selected points determined in the next frame and the predicted locations to calculate updated calibration factors and the covariance between errors of estimated calibration parameters. In various embodiments, the Kalman filter may be an extended Kalman filter (EKF).

In some embodiments, the EKF may be initialized with a state variable $x=[c_x, c_y, f_x, f_y, d_1, d_2, d_3, d_4, w_x, w_y, w_z, t_d, v_x, v_y, v_z]^T$ where:

$c_x$ is the x-axis coordinate of the principal point;
$c_y$ is the y-axis coordinate of the principal point;
$f_x$ is the focal length along the x-axis;
$f_y$ is the focal length along the y-axis;
$d_1$ is a first distortion parameter;
$d_2$ is a second distortion parameter;
$d_3$ is a third distortion parameter;
$d_4$ is a fourth distortion parameter;
$w_x$ is the x-axis coordinate associated with the camera-gyroscope orientation;
$w_y$ is the y-axis coordinate associated with the camera-gyroscope orientation;
$w_z$ is the z-axis coordinate associated with the camera gyroscope orientation;
$t_d$ is the camera-gyroscope time offset;
$v_x$ is the x-axis coordinate associated with the camera velocity in the inertial frame of reference;
$v_y$ is the y-axis coordinate associated with the camera velocity in the inertial frame of reference; and
$v_z$ is the z-axis coordinate associated with the camera velocity in the inertial frame of reference.

The principal point parameters and the focal point parameters may be determined using an intrinsic matrix $$K = \begin{bmatrix} f_x & 0 & c_x \\ 0 & f_y & c_y \\ 0 & 0 & 1 \end{bmatrix}.$$

If the camera implements a fisheye lens, the distortion parameters may be determined using a fisheye distortion model $d=[d_1, d_2, d_3, d_4]$, where the distortion model may be based on the projection model. However, any model may be used to determine the distortion parameters.

The camera-gyroscope orientation parameters may be specified in an axis-angle representation.

By implementing a state variable that includes all calibration parameters including camera velocity v, the calibration method may rely on images captured by the camera while the camera moves within full six degrees of freedom. By omitting the camera velocity, the calibration method may be limited to using only rotational movement parameters associated with the camera, which reduces the accuracy of the calibration and subsequent processing of the captured images.

After the EKF is initialized using the state variable x, the EKF may be used to perform a measurement function (h(x)) and a prediction function (f(x)).

The measurement function h(x) of the EKF may be determined using the following equation:

$$h(x) = \frac{l^T}{\|l\|} \hat{p}_2$$

where l corresponds to the epipolar line:

$$l = (R_w^T R_2 R_w v) \times \tilde{p}_1$$

One pair of tracked feature points (p1, p2) may be determined between two image frames. A rotation matrix may be estimated based on the gyroscope measurements: $R_1(p_1, t_d)$, $R_2(p_2, t_d)$, where $R_1$ corresponds to a gyroscope estimate at the same time as $p_i$ is captured. Specifically, a spherical linear interpolation (SLERP) may be performed using two gyroscope measurement samples. The EKF may then be used to normalize and undistort the two image frames using the following equation:

$$\tilde{p}_i = \rho_d^{-1}\left(K^{-1}\begin{bmatrix} p_i \\ 1 \end{bmatrix}\right), i = 1, 2$$

where $\rho_d(\ )$ is the distortion function associated with the distortion model. The EKF may then be used to project a location of the object from the first frame to the second frame using the following equation:

$$\tilde{p}_1 = R_w^T R_2 R_1^T R_w \hat{p}_1$$

where $R_w$ is the camera-gyroscope orientation values converted into a rotational matrix.

The prediction function f(x) of the EKF may be approximately equal to the state variable x because the calibration parameters either remain constant or slowly change. The prediction function may be determined using a constant velocity model.

The EKF may be iteratively performed for each input image pair where the EKF is looped or repeated for each tracked feature point pair (k) between the image frame pair. For example, $R_1$ and $R_2$ may be estimated using $t_d$ from $\hat{x}_k$ and the predicted measurement may be calculated using the equation:

$$\hat{z}_k = h(\hat{x}_k)$$

The EKF measurement noise may be further multiplied by:

$$\omega(\hat{z}_k)$$

In addition, the EKF prediction function h(x) may be performed and updated. For example, the actual measurement $Z_k$ may be zero.

In determination block 418, the processor may determine whether the covariance between errors of estimated calibration parameters is within a threshold variance. That is, the processor may compare the covariance between errors of estimated calibration parameters with a predetermined threshold variance stored in memory (e.g., 116).

In response to determining that the covariance between errors of estimated calibration parameters is not within a threshold variance (i.e., determination block 418="No"), the processor may store and/or use the calculated updated calibration parameters in block 420 and repeat the calibration operations by obtaining a next image frame and timestamp in block 308 using the updated calibration parameter to process the raw image data from the image sensor (e.g., 102).

In response to determining that the covariance between errors of estimated calibration parameters is within the threshold variance (i.e., determination block 418="Yes"), the processor may end the calibration process in block 324 and perform subsequent image processing of data from the image sensor (e.g., 102) using the calculated calibration parameters stored in memory. For example, the calculated calibration parameters may be used to process data from the camera to undistort distortions caused by a lens. As another example, the calculated calibration parameters may be used as inputs to a computer vision or machine vision algorithm. The stored calibration parameters may be either the calibration parameters calculated in block 318 or calibration parameters calculated in the previous iteration of the method 400.

Optionally, in determination block 326, the processor may determine whether an event triggering recalibration has occurred. For example, a recalibration detector (e.g., 114) may determine whether a time triggering event or a physical triggering event has occurred. In response to determining that a triggering event has not happened (i.e., determination block 326="No"), the processor may continue to perform image processing using the calculated calibration parameters in block 324. In response to determining that a triggering event has happened (i.e., determination block 326="Yes"), the processor may repeat the calibration procedure by obtaining an image frame and timestamp returns in block 304.

Figure 5:
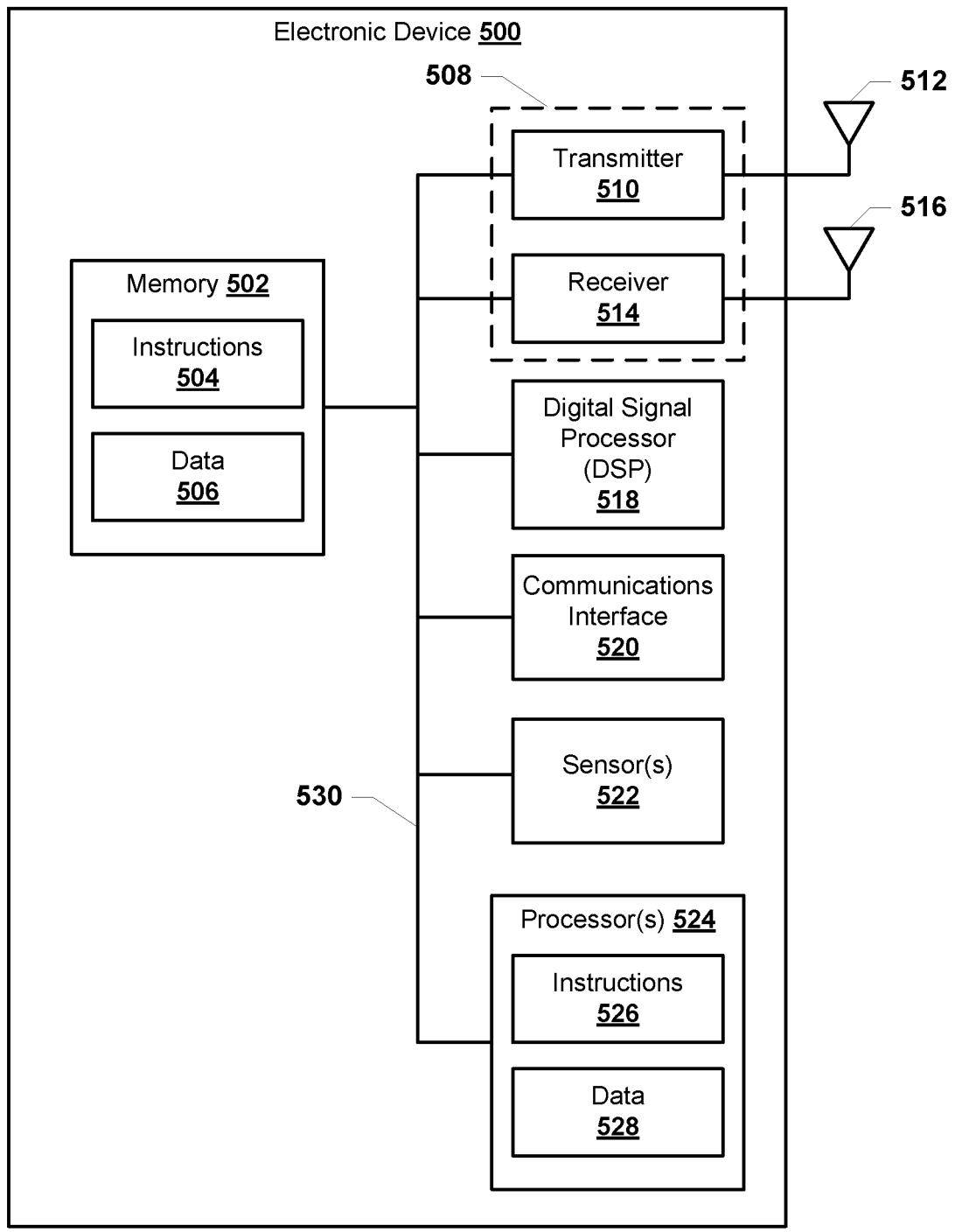
FIG. 5 is a component block diagram illustrating components of an electronic device suitable for use with various embodiments.

FIG. 5 is a component block diagram illustrating components that may be included within an electronic device configured to implement various configurations of the systems and methods of calibrating a camera according to various embodiments. Examples of the electronic device 500 include a camera, a video camcorder, a digital camera, a cellular phone, a smartphone, a computer (e.g., a desktop computer, a laptop computer, etc.), a tablet device, a drone, an unmanned aerial vehicle (UAV), etc. One or more of the components or elements of the electronic device 100 may be implemented in hardware (e.g., circuitry) or a combination of hardware and software (e.g., at least one processor with instructions). The electronic device 500 may be implemented in accordance with the electronic device 100 and/or the electronic device 700. The electronic device may include a processor 524, which may be a general purpose single-chip or multi-chip microprocessor (e.g., an ARM), a special purpose microprocessor such as digital signal processor (DSP) 518.

The electronic device 500 may also include memory 502 coupled to the processor 524. The memory 502 may be any electronic component capable of storing electronic information. The memory 502 may be embodied as random access memory (RAM), read-only memory (ROM), magnetic disk storage medial, optical storage media, flash memory devices in RAM, on-board memory included with the processor, EPROM memory, EEPROM memory, registers, and so forth including combinations thereof.

Data 506 and instructions 504 may be stored in the memory 502. The instructions 504 may be executable by the processor 524 to implement one or more of the methods (e.g., methods 300 or 400), procedures, steps, and/or functions described herein. Executing the instructions 504 may involve the use of the data 506 stored in the memory. When the processor 524 executes the instructions 504, various portions of the instructions 526 may be loaded onto the processor 524 and/or various pieces of data 528 may be loaded onto the processor 524.

The electronic device 500 may also include a transmitter 510 and a receiver 514 to allow transmission and reception of signals to and from the electronic device 500. The transmitter 510 and the receiver 514 may be collectively referred to as transceiver 508. One or more antennas 512, 516 may be electrically coupled to the transceiver 508. The electronic device 500 may also include (not shown) multiple transmitters, multiple receivers, multiple transceivers and/or additional antennas.

The electronic device 500 may also include a communication interface 520. The communication interface 520 may allow and/or enable one or more kinds of input and/or output. For example, the communication interface 520 may include one or more ports and/or communication devices for linking other devices to the electronic device 500. In some configurations, the communication interface 520 may include the transmitter 510, the receiver 514, or both (e.g., the transceiver 508). Additional or alternatively, the communication interface 520 may include one or more other interfaces (e.g., touchscreen, keypad, keyboard, microphone, camera, etc.). For example, the communication interface 520 may enable a user to interact with the electronic device 500.

The electronic device 500 may also include one or more sensor(s) 522. The one or more sensor(s) 522 may include a proximity sensor, an ambient light sensor, an accelerometer, a near field communication sensor, a gyroscope, a magnetometer, a temperature sensor, a barometric pressure, a color sensor, an ultraviolet sensor, a GPS sensor, etc.

The various components of the electronic device 500 may be coupled together by one or more buses, which may include a power bus, a control signal bus, a status signal bus, a data bus, etc. For the sake of clarity, the various buses are illustrated in FIG. 5 as a bus system 530.

Figure 6:
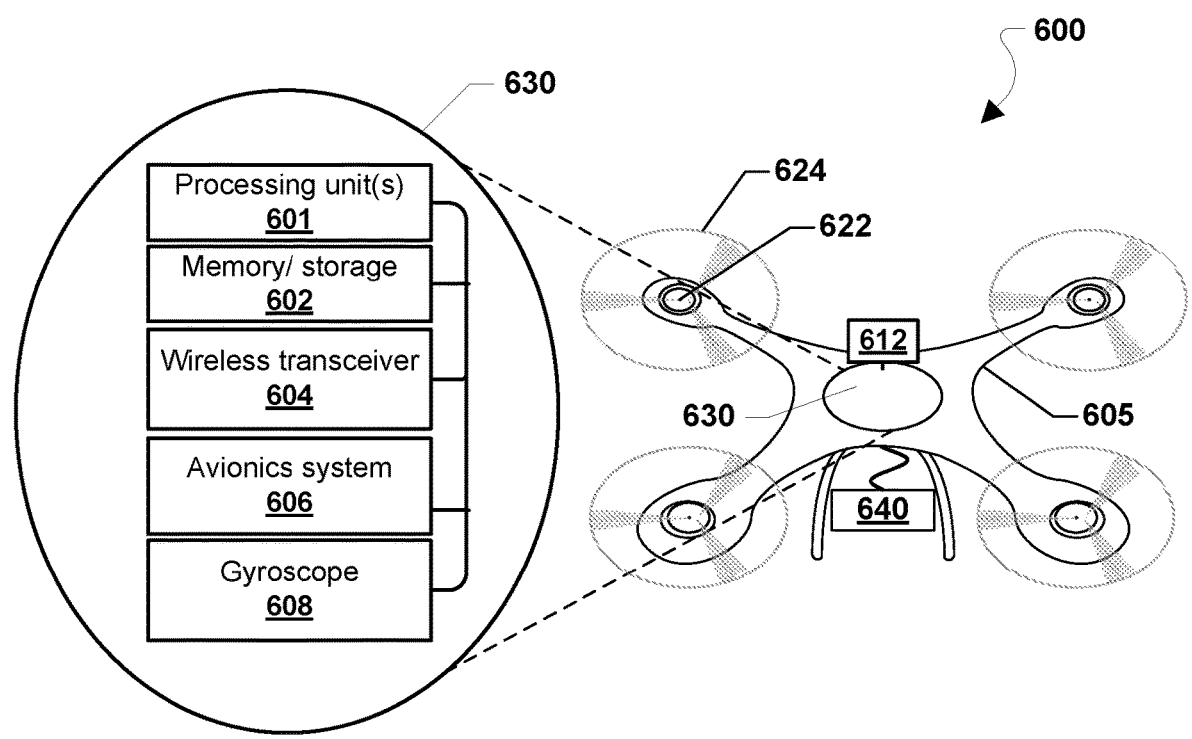
FIG. 6 is a component block diagram of a drone suitable for use with various embodiments.

Various embodiments may be implemented in a variety of drones configured with a camera, an example of which is a four-rotor drone illustrated in FIG. 6. With reference to FIGS. 1-6, a drone 600 may include a body 605 (i.e., fuselage, frame, etc.) that may be made out of any combination of plastic, metal, or other materials suitable for flight. For ease of description and illustration, some detailed aspects of the drone 600 are omitted, such as wiring, frame structure, power source, landing columns/gear, or other features that would be known to one of skill in the art. In addition, although the example drone 600 is illustrated as a "quad-copter" with four rotors, the one or more of drones 600 and may include more or fewer than four rotors. Also, the one or more of drones 600 may have similar or different configurations, numbers of rotors, and/or other aspects. Various embodiments may also be implemented with other types of drones, including other types of autonomous aircraft, land vehicles, waterborne vehicles, or a combination thereof.

The body 605 may include a processor 630 that is configured to monitor and control the various functionalities, subsystems, and/or other components of the drone 600. For example, the processor 630 may be configured to monitor and control any combination of modules, software, instructions, circuitry, hardware, etc. related to camera calibration as described, as well as propulsion, navigation, power management, sensor management, and/or stability management.

The processor 630 may include one or more processing unit(s) 601, such as one or more processors configured to execute processor-executable instructions (e.g., applications, routines, scripts, instruction sets, etc.) to control flight and other operations of the drone 600, including operations of various embodiments. The processor 630 may be coupled to a memory unit 602 configured to store data (e.g., flight plans, obtained sensor data, received messages, applications, etc.). The processor may also be coupled to a wireless transceiver 604 configured to communicate via wireless communication links with ground stations and/or other drones.

The processor 630 may also include an avionics module or system 606 configured to receive inputs from various sensors, such as a gyroscope 608, and provide attitude and velocity information to a processing unit 601.

In various embodiments, the processor 630 may be coupled to a camera 640 configured to perform operations of various embodiments as described. In some embodiments, the drone processor 630 may receive image frames from the camera 640 and rotation rate and direction information from the gyroscope 608, and perform operations as described. In some embodiments, the camera 640 may include a separate gyroscope (not shown) and a processor (not shown) configured to perform operations as described.

Drones may be winged or rotor craft varieties. For example, the drone 600 may be a rotary propulsion design that utilizes one or more rotors 624 driven by corresponding motors 622 to provide lift-off (or take-off) as well as other aerial movements (e.g., forward progression, ascension, descending, lateral movements, tilting, rotating, etc.). The drone 600 is illustrated as an example of a drone that may utilize various embodiments, but is not intended to imply or require that various embodiments are limited to rotor craft drones. Instead, various embodiments may be implemented on winged drones as well. Further, various embodiments may equally be used with land-based autonomous vehicles, water-borne autonomous vehicles, and space-based autonomous vehicles.

A rotor craft drone 600 may utilize motors 622 and corresponding rotors 624 for lifting off and providing aerial propulsion. For example, the drone 600 may be a quadcopter" that is equipped with four motors 622 and corresponding rotors 624. The motors 622 may be coupled to the processor 630 and thus may be configured to receive operating instructions or signals from the processor 630. For example, the motors 622 may be configured to increase rotation speed of their corresponding rotors 624, etc. based on instructions received from the processor 630. In some embodiments, the motors 622 may be independently controlled by the processor 630 such that some rotors 624 may be engaged at different speeds, using different amounts of power, and/or providing different levels of output for moving the drone 600.

The body 605 may include a power source 612 that may be coupled to and configured to power the various components of the drone 600. For example, the power source 612 may be a rechargeable battery for providing power to operate the motors 622, the camera 640, and/or the units of the processor 630.

Figure 7:
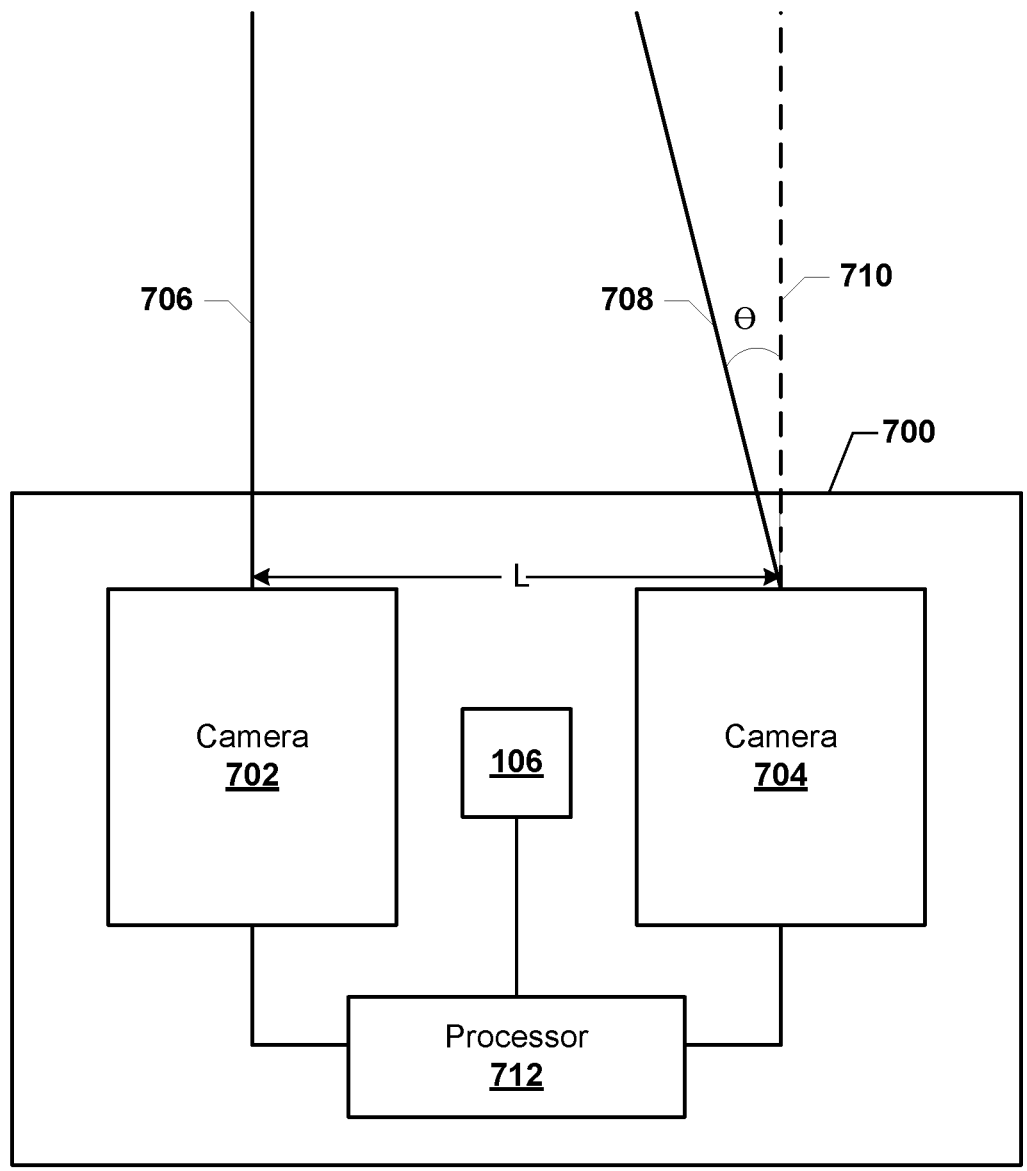
FIG. 7 is a component block diagram of a stereographic electronic device suitable for use with various embodiments.
Figure 8:
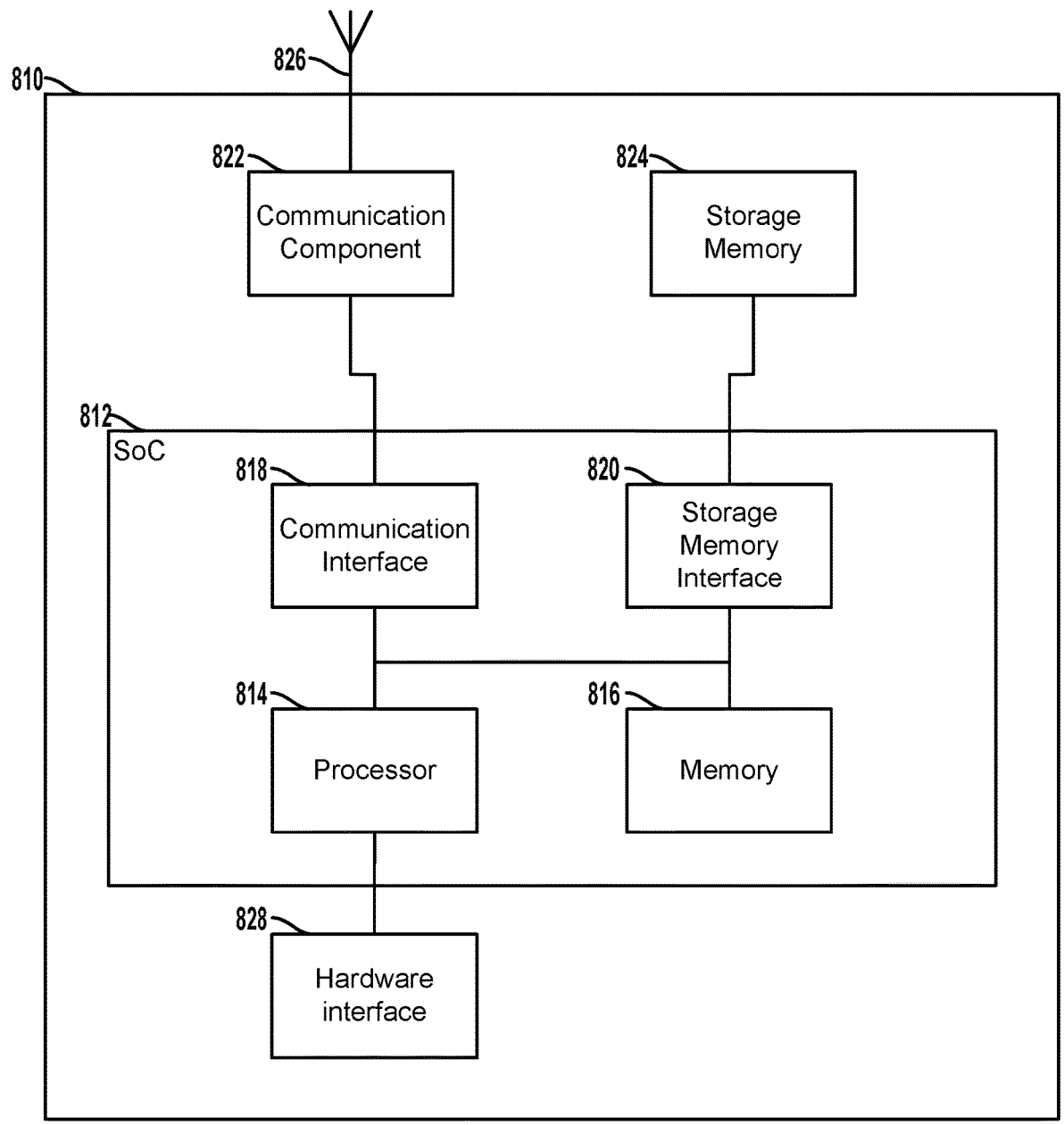
FIG. 8 is a component block diagram illustrating a processing device suitable for implementing various embodiments.

Various embodiments may be implemented in a variety of electronic devices configured with stereographic cameras, an example of which is illustrated in FIG. 7. With reference to FIGS. 1-5 and 7, an electronic device 700 may be an electronic device 100 including at least two cameras 702, 704 arranged in a stereographic configuration, a gyroscope 106, and a processor 712 coupled to the gyroscope 106, the first camera 702 and the second camera 704. For ease of description and illustration, some detailed aspects of the stereographic electronic device 700 are omitted, such as an image sensor 102 and/or optical system 104 in communication with the first camera 702 and/or the second camera 704, or other features that would be known to one of skill in the art. In addition, although the example electronic device 700 is illustrated with two stereographic cameras 702, 704, the electronic device 700 may include one or more additional cameras, which may be in a single camera configuration and/or a stereographic configuration. Various embodiments may be implemented in various types of electronic devices including drones, virtual reality headsets, augmented reality headsets, and the like.

The first camera 702 may be aligned with a first axis 706. Since it is difficult to mount cameras such that the focal axis is exactly parallel with each other, the second camera 704 may be aligned with a second axis 708 that is tangent to but not parallel with the first axis 706.

In various embodiments, a processor 712 of the electronic device 700 may perform operations of various embodiments as described. In some embodiments, the processor 712 of the electronic device 700 may receive image frames from the first camera 702 and/or the second camera 704 and rotation rate and direction information from a gyroscope 106, and perform operations as described.

In some embodiments, the processor 712 of the electronic device 700 may calibrate the first camera 702 and the second camera 704 separately using information from the gyroscope 106. For example, the processor 712 may use the gyroscope information to determine the orientation and velocity parameters associated with calibrating the first camera 702 and the second camera 704. In some embodiments, the gyroscope information may be used to rectify the depth of the resulting stereo images captured by the first camera 702 and the second camera 704. The calibration may be used by the processor 712 to fine tune the location of each pixel in the captured images in order to better determine a location of objects as well as predict the location of the objects in a subsequent image frame.

In some embodiments, the processor 712 of the electronic device 700 may perform calibration operations to overcome an alignment angle (Θ). For example, based on the calibration done separately on the first camera 702 and the second camera 704, the processor 712 may determine the orientation between the first camera 702 and the gyroscope 106 as well as the orientation between the second camera 704 and the gyroscope 106. The processor 712 may then determine a reference orientation of the gyroscope 106 to determine the alignment angle (Θ) between the second axis 708 and the desired alignment axis 710.

In some embodiments, the processor 712 of the electronic device 700 may further calibrate the first camera 702 and/or the second camera 704 using a translational component. For example, the processor 712 may determine the distance L between the first camera 702 and the second camera 704 and a direction of displacement of the electronic device 700 to determine a translational calibration component. The translational calibration component may be added to at least some of the above identified calibration parameters in order to calibrate the first camera 702 and/or the second camera 704 of the electronic device 700.

Various embodiments may be implemented within a processing device 810 configured to be used in electronic devices. A processing device may be configured as or including a system-on-chip (SoC) 812, an example of which is illustrated FIG. 8. With reference to FIGS. 1-8, the SOC 812 may include (but is not limited to) a processor 814, a memory 816, a communication interface 818, and a storage memory interface 820. The processing device 810 or the SOC 812 may further include a communication component 822, such as a wired or wireless modem, a storage memory 824, an antenna 826 for establishing a wireless communication link, and/or the like. The processing device 810 or the SOC 812 may further include a hardware interface 828 configured to enable the processor 814 to communicate with and control various components of an electronic device. In particular, the hardware interface 828 may be configured to be coupled to and communicate with and/or receive data from a camera and a gyroscope within the electronic device.

The term "system-on-chip" (SoC) is used herein to refer to a set of interconnected electronic circuits typically, but not exclusively, including one or more processors (e.g., 814), a memory (e.g., 816), and a communication interface (e.g., 818). The SOC 812 may include a variety of different types of processors 814 and processor cores, such as a general purpose processor, a central processing unit (CPU), a digital signal processor (DSP), a graphics processing unit (GPU), an accelerated processing unit (APU), a subsystem processor of specific components of the processing device, such as an image processor for a camera subsystem or a display processor for a display, an auxiliary processor, a single-core processor, and a multicore processor. The SOC 812 may further embody other hardware and hardware combinations, such as a field programmable gate array (FPGA), an application-specific integrated circuit (ASIC), other programmable logic device, discrete gate logic, transistor logic, performance monitoring hardware, watchdog hardware, and time references. Integrated circuits may be configured such that the components of the integrated circuit reside on a single piece of semiconductor material, such as silicon.

The SoC 812 may include one or more processors 814. The processing device 810 may include more than one SoC 812, thereby increasing the number of processors 814 and processor cores. The processing device 810 may also include processors 814 that are not associated with an SoC 812 (i.e., external to the SoC 812). Individual processors 814 may be multicore processors. The processors 814 may each be configured for specific purposes that may be the same as or different from other processors 814 of the processing device 810 or SOC 812. One or more of the processors 814 and processor cores of the same or different configurations may be grouped together. A group of processors 814 or processor cores may be referred to as a multi-processor cluster.

The memory 816 of the SoC 812 may be a volatile or non-volatile memory configured for storing data and processor-executable instructions for access by the processor 814. The processing device 810 and/or SoC 812 may include one or more memories 816 configured for various purposes. One or more memories 816 may include volatile memories such as random access memory (RAM) or main memory, or cache memory.

Some or all of the components of the processing device 810 and the SOC 812 may be arranged differently and/or combined while still serving the functions of the various aspects. The processing device 810 and the SOC 812 may not be limited to one of each of the components, and multiple instances of each component may be included in various configurations of the processing device 810.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment. For example, one or more of the operations of the methods 300 and 400 may be substituted for or combined with one or more operations of the methods 300 and 400, and vice versa.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. For example, operations to predict locations of objects in a next image frame may be performed before, during or after the next image frame is obtained, and measurements of rotational velocity by a gyroscope may be obtained at any time or continuously during the methods.

Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present disclosure is not intended to be limited to the embodiments shown herein but is to be accorded the widest scope consistent with the following claims and the principles and novel features disclosed herein.

What is claimed is:

1. A method of calibrating a camera, comprising:
   receiving, by a processor, a first image frame and a second image frame;
   determining, by the processor, a first location of a point in the first image frame and a second location of the point in the second image frame;
   determining, by the processor, a predicted location of the point in the second image frame based on a measurement of rotational velocity of the camera and the determined first location;
   determining, by the processor, a first set of calibration parameters for the camera based on a difference between the predicted location and the determined second location;
   determining, by the processor, a second set of calibration parameters that zero out differences between the predicted location and the determined second location;
   determining a confidence value of the determined second set of calibration parameters for the camera, wherein the confidence value is based on a magnitude of the determined difference between the predicted location and the determined second location;

determining whether the confidence value of the determined second set of calibration parameters exceeds a threshold value; and using, by the processor, the determined second set of calibration parameters to process raw image data from the camera and produce a next image frame in response to determining that the confidence value of the determined second set of calibration parameters exceeds the threshold value.

2. The method of claim 1, further comprising:

storing, by the processor in a memory, the determined second location; and storing, by the processor in the memory, the predicted location, wherein determining the first set of calibration parameters for the camera based on the difference between the predicted location and the determined second location comprises determining the first set of calibration parameters based on the stored second location and the stored predicted location.

3. The method of claim 1, further comprising:

using either the determined first set of calibration parameters or the determined second set of calibration parameters to process data from the camera in response to determining that the confidence value of the determined second set of calibration parameters does not exceed the threshold value.

4. The method of claim 1, wherein determining the first set of calibration parameters for the camera based on the difference between the predicted location and the determined second location comprises applying the predicted location and the determined second location to a Kalman filter.

5. The method of claim 4, wherein the Kalman filter is an extended Kalman filter.

6. The method of claim 1, wherein using the determined second set of calibration parameters to process raw image data from the camera and produce the next image frame in response to determining that the confidence value of the determined second set of calibration parameters exceeds the threshold value comprises using the determined second set of calibration parameters to process data from the camera to undistort distortions caused by a lens in response to determining that the confidence value of the determined second set of calibration parameters exceeds the threshold value.

7. The method of claim 1, wherein using the determined second set of calibration parameters to process raw image data from the camera and produce the next image frame in response to determining that the confidence value of the determined second set of calibration parameters exceeds the threshold value comprises using the determined second set of calibration parameters as inputs to a computer vision or machine vision algorithm in response to determining that the confidence value of the determined second set of calibration parameters exceeds the threshold value.

8. The method of claim 1, wherein the processor and a gyroscope are included within the camera.

9. The method of claim 1, wherein the camera is in an electronic device, and the processor and a gyroscope are in the electronic device.

10. The method of claim 1, wherein the camera is on a drone that comprises an avionics unit, and wherein determining the first set of calibration parameters for the camera based on the difference between the predicted location and the determined second location further comprises determining the first set of calibration parameters based on translational velocity information, acceleration information, or both translational velocity and acceleration information received from the avionics unit.

11. An electronic device, comprising:

a camera;

a gyroscope;

a memory; and a processor coupled to the camera, the gyroscope and the memory, wherein the processor is configured with processor-executable instructions to perform operations comprising:

receiving a first image frame and a second image frame from the camera;

determining a first location of a point in the first image frame and a second location of the point in the second image frame;

determining a predicted location of the point in the second image frame based on a measurement of rotational velocity of the camera and the determined first location;

determining a first set of calibration parameters for the camera based on a difference between the predicted location and the determined second location;

determining a second set of calibration parameters that zero out differences between the predicted location and the determined second location;

determining a confidence value of the determined second set of calibration parameters for the camera, wherein the confidence value is based on a magnitude of the determined difference between the predicted location and the determined second location;

determining whether the confidence value of the determined second set of calibration parameters exceeds a threshold value; and using the determined second set of calibration parameters to process raw image data from the camera and produce a next image frame in response to determining that the confidence value of the determined second set of calibration parameters exceeds the threshold value.

12. The electronic device of claim 11, wherein the processor is configured with processor-executable instructions to perform operations further comprising:

storing, in the memory, the determined second location; and storing, in the memory, the predicted location, wherein determining, by the processor, the first set of calibration parameters for the camera based on the determined difference between the predicted location and the determined second location comprises determining the first set of calibration parameters based on the stored second location and the stored predicted location.

13. The electronic device of claim 11, wherein the processor is configured with processor-executable instructions to perform operations further comprising:

using either the determined first set of calibration parameters or the determined second set of calibration parameters to process data from the camera in response to determining that the quality or confidence value of the determined second set of calibration parameters does not exceed the threshold value.

14. The electronic device of claim 11, wherein the processor is configured with processor-executable instructions to perform operations such that determining the first set of calibration parameters for the camera based on the determined difference between the predicted location and the determined second location comprises applying the predicted location and the determined location to a Kalman filter.

15. The electronic device of claim 14, wherein the Kalman filter is an extended Kalman filter.

16. The electronic device of claim 11, wherein the processor is configured with processor-executable instructions to perform operations such that using the determined second set of calibration parameters to process raw image data from the camera and produce the next image frame in response to determining that the confidence value of the determined second set of calibration parameters exceeds the threshold value comprises using the determined second set of calibration parameters to process raw image data from the camera to undistort distortions caused by a lens in response to determining that the confidence value of the determined second set of calibration parameters exceeds the threshold value.

17. The electronic device of claim 11, wherein the processor is configured with processor-executable instructions to perform operations such that using the determined second set of calibration parameters to process raw image data from the camera and produce the next image frame in response to determining that the confidence value of the determined second set of calibration parameters exceeds the threshold value comprises using the determined second set of calibration parameters as inputs to a computer vision or machine vision algorithm.

18. The electronic device of claim 11, wherein the processor and the gyroscope are included within the camera.

19. The electronic device of claim 11, wherein the electronic device is a drone that further comprises an avionics unit, and
wherein the processor is configured with processor-executable instructions to perform operations such that determining the first set of calibration parameters for the camera based on the determined difference between the predicted location and the determined second location comprises determining the first set of calibration parameters based on translational velocity information, acceleration information, or both translational velocity and acceleration information received from the avionics unit.

20. A processing device configured to be coupled to a camera and a gyroscope of an electronic device and configured to:
receive a first image frame and a second image frame from the camera;
determine a first location of a point in the first image frame and a second location of the point in the second image frame;
determine a predicted location of the point in the second image frame based on a measurement of rotational velocity of the camera and the determined first location;
determine a first set of calibration parameters for the camera based on a difference between the predicted location and the determined second location;
determine a second set of calibration parameters that zero out differences between the predicted location and the determined second location;
determining a confidence value of the determined second set of calibration parameters for the camera, wherein the confidence value is based on a magnitude of the determined difference between the predicted location and the determined second location;
determining whether the confidence value of the determined second set of calibration parameters exceeds a threshold value; and
use the determined second set of calibration parameters to process raw image data from the camera and produce a next image frame in response to determining that the confidence value of the determined second set of calibration parameters exceeds the threshold value.

21. The processing device of claim 20, wherein the processing device is further configured to:
store the determined second location; and
store the predicted location,
wherein the processing device is further configured to determine the first set of calibration parameters for the camera based on the stored second location and the stored predicted location.

22. The processing device of claim 20, wherein the processing device is further configured to:
use either the determined first set of calibration parameters or the determined second set of calibration parameters to process data from the camera in response to determining that the quality or confidence value of the determined second set of calibration parameters does not exceed the threshold value.

23. The processing device of claim 20, wherein the processing device is further configured to determine the first set of calibration parameters for the camera based on the determined difference between the predicted location and the determined second location by applying the predicted location and the determined second location to a Kalman filter.

24. The processing device of claim 23, wherein the Kalman filter is an extended Kalman filter.

25. The processing device of claim 20, wherein the processing device is further configured to use the determined second set of calibration parameters to process raw image data from the camera to undistort distortions caused by a lens in response to determining that the confidence value of the determined second set of calibration parameters exceeds the threshold value.

26. The processing device of claim 20, wherein the processing device is further configured to use the determined second set of calibration parameters as inputs to a computer vision or machine vision algorithm to process data from the camera in response to determining that the confidence value of the determined second set of calibration parameters exceeds the threshold value.

27. The processing device of claim 20, wherein the processing device is configured to be implemented on a drone that comprises an avionics unit, and wherein the processing device is further configured to determine the first set of calibration parameters for the camera based on the determined difference between the predicted location and the determined second location by determining the first set of calibration parameters based on translational velocity information, acceleration information, or both translational velocity and acceleration information received from the avionics unit.

28. An electronic device, comprising:
a camera;
a gyroscope;
means for receiving a first image frame and a second image frame from the camera;
means for determining a first location of a point in the first image frame and a second location of the point in the second image frame;

means for determining a predicted location of the point in the second image frame based on a measurement of rotational velocity of the camera and the determined first location;

means for determining a first set of calibration parameters for the camera based on a difference between the predicted location and the determined second location;

means for determining a second set of calibration parameters that zero out differences between the predicted location and the determined second location;

means for determining a confidence value of the determined second set of calibration parameters for the camera, wherein the confidence value is based on a magnitude of the determined difference between the predicted location and the determined second location;

means for determining whether the confidence value of the determined second set of calibration parameters exceeds a threshold value; and means for using the determined second set of calibration parameters to process raw image data from the camera and produce a next image frame in response to determining that the confidence value of the determined second set of calibration parameters exceeds the threshold value.

* * * * *